(12) United States Patent
Xie

(10) Patent No.: US 9,983,434 B2
(45) Date of Patent: May 29, 2018

(54) TRANSFLECTIVE LIQUID CRYSTAL DISPLAY PANEL AND TRANSFLECTIVE LIQUID CRYSTAL DISPLAY DEVICE

(71) Applicant: Wuhan China Star Optoelectronics Technology Co., Ltd., Wuhan, Hubei (CN)

(72) Inventor: Chang Xie, Hubei (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 0 days. days.

(21) Appl. No.: 14/778,139

(22) PCT Filed: Apr. 23, 2015

(86) PCT No.: PCT/CN2015/077276
§ 371 (c)(1),
(2) Date: Nov. 23, 2016

(87) PCT Pub. No.: WO2016/161669
PCT Pub. Date: Oct. 13, 2016

(65) Prior Publication Data
US 2017/0102584 A1   Apr. 13, 2017

(30) Foreign Application Priority Data
Apr. 8, 2015 (CN) .......................... 2015 1 0162815

(51) Int. Cl.
*G02F 1/1335* (2006.01)

(52) U.S. Cl.
CPC .. *G02F 1/133555* (2013.01); *G02F 1/133528* (2013.01)

(58) Field of Classification Search
CPC .................. G02F 1/133555; G02F 1/133528
See application file for complete search history.

(56) References Cited

U.S. PATENT DOCUMENTS

| | | | |
|---|---|---|---|
| 8,675,158 B2 * | 3/2014 | Kimura | G02F 1/133345 349/114 |
| 2003/0025863 A1 * | 2/2003 | Lijima | G02F 1/133555 349/122 |

(Continued)

FOREIGN PATENT DOCUMENTS

JP         2003330024 A   * 11/2003

*Primary Examiner* — Jia Pan
(74) *Attorney, Agent, or Firm* — Kim Winston LLP

(57) ABSTRACT

Disclosed is a transflective liquid crystal display panel and transflective liquid crystal display device. The transflective liquid crystal display panel includes: an array substrate which is provided thereon with a plurality of sub-pixel areas, each of the sub-pixel areas including a transmissive area and a reflecting area; and a polarizer arranged at an outer surface of the array substrate and having a first surface facing a backlight source. An area of the first surface, which corresponds to the reflecting area, is at least partly provided therein with a reflecting layer. The present disclosure achieves the technical effect of preventing the light emitted by a backlight source from being absorbed by the polarizer in the reflecting process, thus avoiding light loss and consequently improving the utilization rate of the backlight source. The display panel and the display device provided by the present disclosure are simple in structures, which greatly reduces the production cost thereof.

6 Claims, 1 Drawing Sheet

(56) References Cited

U.S. PATENT DOCUMENTS

| | | | |
|---|---|---|---|
| 2003/0112391 A1* | 6/2003 | Jang | G02F 1/133555 349/114 |
| 2006/0187385 A1* | 8/2006 | Liao | G02F 1/133305 349/114 |
| 2009/0219474 A1* | 9/2009 | Chu | G02F 1/1334 349/114 |
| 2014/0132898 A1* | 5/2014 | Qin | G02F 1/133536 349/103 |
| 2014/0139789 A1* | 5/2014 | Guo | G02F 1/1335 349/96 |
| 2014/0293187 A1* | 10/2014 | Nam | G02F 1/13362 349/62 |
| 2015/0198833 A1* | 7/2015 | Chung | G02B 5/3058 349/67 |

\* cited by examiner

TRANSFLECTIVE LIQUID CRYSTAL DISPLAY PANEL AND TRANSFLECTIVE LIQUID CRYSTAL DISPLAY DEVICE

CROSS REFERENCE TO RELATED APPLICATIONS

The present application claims the priority of Chinese patent application CN201510162815.4, entitled "Transflective liquid crystal display panel and transflective liquid crystal display device" and filed on Apr. 8, 2015, the entirety of which is incorporated herein by reference.

TECHNICAL FIELD

The present disclosure relates to the technical field of liquid crystal displays, and in particular, to a transflective liquid crystal display panel and a transflective liquid crystal display device.

TECHNICAL FIELD

At present, liquid crystal display panels can be divided into transmissive, reflective, and transflective liquid crystal display panels based on the light sources thereof.

A transflective liquid crystal display panel can be regarded as a combination of a transmissive liquid crystal display panel and a reflective liquid crystal display panel. It is provided with both a reflecting area and a transmissive area on an array substrate thereof, and is able to display images by using a backlight source as well as a frontlight source or an outer light source at the same time. A transflective liquid crystal display panel has the advantages of both a transmissive liquid crystal display panel and a reflective liquid crystal display panel. It can display bright images in a dark place and therefore can be used indoors, and also can be used outdoors. Therefore, transflective liquid crystal display panels have been widely used in portable electronic products.

In order to improve the utilization rate and luminous efficiency of a backlight source, an existing transflective liquid crystal display panel is provided with a reflecting layer on the inner side of an array substrate thereof. However, according to the design in the existing technologies, light produced by a backlight source has to first pass through a polarizer which is arranged outside an array substrate, and then can reach at the a reflecting layer thereof. When the light shining on the reflecting layer is reflected back again, part of the light will be absorbed by the polarizer, which reduces the utilization rate of the backlight source.

Due to the above technical problems, it is desirable in the art to provide a transflective liquid crystal display panel which can improve the utilization rate and luminous efficiency of a backlight source thereof, thus remedying the deficiencies of the existing technologies.

SUMMARY OF THE INVENTION

The technical problem to be solved by the present disclosure is how to improve the utilization rate and luminous efficiency of a backlight source in a transflective liquid crystal display panel. Directed against the above technical problem, the present disclosure provides a new-type transflective liquid crystal display panel and a liquid crystal display device using the transflective liquid crystal display panel.

The transflective liquid crystal display panel provided by the present disclosure comprises: an array substrate which is provided thereon with a plurality of sub-pixel areas, each of the sub-pixel areas comprising a transmissive area and a reflecting area; and a polarizer arranged at an outer surface of the array substrate and having a first surface facing a backlight source. An area of the first surface, which corresponds to the reflecting area, is at least partly provided therein with a reflecting layer.

According to the present disclosure, because the area of the polarizer corresponding to the reflecting area is provided with the reflecting layer, light produced by the backlight source and shining on the reflecting area can be reflected back directly, which improves the utilization rate and luminous efficiency of the backlight source, thereby reducing the power consumption of the display device. Compared with an existing transflective liquid crystal display panel, the transflective liquid crystal display panel according to the present disclosure, which is provided with a reflecting layer on the polarizer thereof, rather than on the inner side of the array substrate thereof, achieves the following technical effects. On the one hand, the light produced by the backlight source is prevented from being absorbed by the polarizer in the reflecting process, thus avoiding light loss and consequently improving the utilization rate of the backlight source. On the other hand, the reflecting layer is covered directly on the polarizer, which renders the display panel simpler in its structure and makes it easier to produce the display panel.

In some embodiments of the present disclosure, the reflecting layer corresponds completely to the reflecting area, which enables the light produced by the backlight source and shining on the reflecting area to be completely reflected back, thus avoiding a loss of light in the reflecting area and absorption of light by the polarizer, thereby improving the reflection efficiency of light.

In some embodiments of the present disclosure, the reflecting layer has a thickness which is configured so as to increase gradually along a direction from an end thereof close to the transmissive area to the reflecting area, which enables the light to be reflected back to the backlight source as much as possible. The light which is reflected back to the backlight source is partly reflected into the transmissive area by a reflecting plate of the backlight source, and the rest of the light is still reflected between the reflecting layer and the backlight source.

In some embodiments of the present disclosure, the reflecting layer is a metal layer. In the present disclosure, a metal layer with a high reflectivity can be used as the reflecting layer, and can be coated directly on the polarizer to improve the utilization rate of the backlight source, which will greatly decrease the production cost of the display panel. A metal with high reflectivity can be selected preferably from aluminum, silver, etc.

In some embodiments of the present disclosure, the surface of the metal layer is configured to be a smooth or rough surface. When the metal layer is provided with a smooth surface, a specular reflection on the smooth surface will occur to the light produced by the backlight source, which can strengthen the brightness. When the metal layer is provided with a rough surface, a diffuse reflection on the rough surface will occur to the light produced by the backlight source. In the diffuse reflection, the light is reflected to all directions uniformly, thus preventing occurrence of local lightspot.

In some embodiments of the present disclosure, the reflecting layer comprises a transparent film layer arranged on the polarizer, and a metal layer coated on the transparent film layer. In the present disclosure, said metal layer having a high reflectivity is coated on the transparent film layer, and then the transparent film layer is stuck to the polarizer at a position corresponding to the reflecting area, which makes the production process and the assembling of the display panel simpler.

In some embodiments of the present disclosure, the polarizer is completely covered by the transparent film layer, and said metal layer is at least partly coated on a region of the transparent film layer corresponding to the reflecting area. The complete coverage of the polarizer by the transparent film layer can prevent the light at the border of the transmissive area and the reflecting area from being transmitted or reflected, thereby avoiding effects on the contrast ratio and saturation of the liquid crystal display panel.

In some embodiments of the present disclosure, the transparent film layer is made of a transparent plastic which is preferably polyvinyl chloride, or polyethylene, or polyethylene terephthalate.

In some embodiments of the present disclosure, the transmissive area and the reflecting area contain a same positive dielectric anisotropy liquid crystal material.

The present disclosure further provides a transflective liquid crystal display device which comprises the above transflective liquid crystal display panel.

Compared with existing technologies, the present disclosure can achieve the following beneficial effects. 1) By providing the reflecting layer at the outer surface of the polarizer, the light produced by the backlight source is effectively prevented from being absorbed by the polarizer in the reflecting process, thus avoiding light loss and consequently improving the utilization rate of the backlight source. 2) The reflecting layer is coated or stuck directly on the polarizer, which renders the display panel simpler in its structure and makes it easier to produce the display panel.

BRIEF DESCRIPTION OF THE DRAWINGS

For further illustrating the technical solutions of the present disclosure, a brief introduction will be provided below with reference to the embodiments and the accompanying drawings.

In the accompanying drawings, same components are indicated using same reference signs. The drawings are not drawn to scale.

DETAILED DESCRIPTION OF THE EMBODIMENTS

The present disclosure will be further explained in detail with reference to the accompanying drawings.

The details provided herein are merely exemplary in nature, and serve only as examples in discussing the embodiments of the present disclosure, as well as the most useful and comprehensible description about the present disclosure with respect to the principle and concepts thereof. These descriptions are provided only for basic understanding of the present application. One skilled in the art can clearly understand, based on the description and the accompanying drawings, how to implement the present disclosure in different ways.

Figure 1:
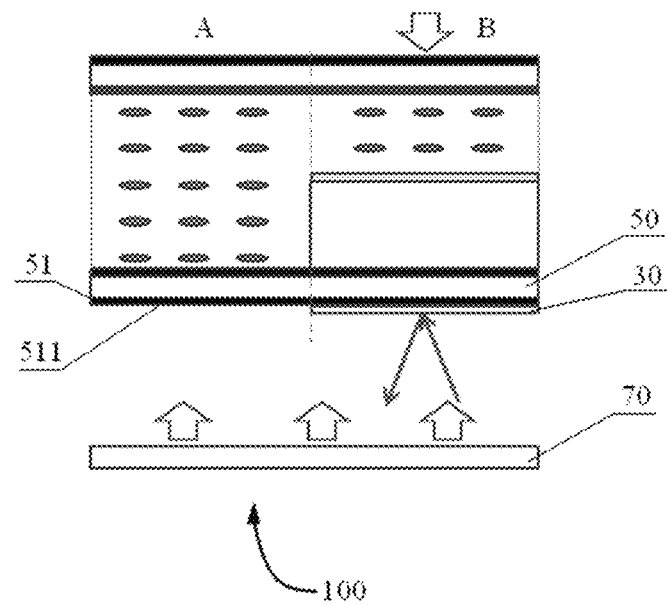
FIG. 1 schematically shows the structure of a transflective liquid crystal display panel according to embodiment 1 of the present disclosure.

FIG. 1 schematically shows the structure of a transflective liquid crystal display panel 100 provided by the present disclosure. The display panel 100 comprises an array substrate 50 which is provided thereon with a plurality of sub-pixel areas. Each of the sub-pixel areas comprises a transmissive area A and a reflecting area B. The display panel 100 further comprises a polarizer 51 arranged at an outer surface of the array substrate 50 and having a first surface 511 facing a backlight source 70. An area of the first surface 511, which corresponds to the reflecting area B, is at least partly provided therein with a reflecting layer.

According to the present disclosure, because the area of the polarizer corresponding to the reflecting area B is provided with the reflecting layer, light produced by the backlight source and shining on the reflecting area B can be reflected back directly, which improves the utilization rate and luminous efficiency of the backlight source, thereby reducing the power consumption of the display device. Compared with an existing transflective liquid crystal display panel, the transflective liquid crystal display panel according to the present disclosure, which is provided with a reflecting layer on the polarizer thereof, rather than on the inner side of the array substrate thereof, achieves the following technical effects. On the one hand, the light produced by the backlight source 70 is prevented from being absorbed by the polarizer in the reflecting process, thus avoiding light loss and consequently improving the utilization rate of the backlight source 70. On the other hand, the reflecting layer is covered directly on the polarizer 51, rendering the production process of the display panel simple and the production cost thereof low, and meanwhile ensuring an excellent performance of the display device.

According to embodiment 1 of the present disclosure, as shown in FIG. 1, the reflecting layer 30 corresponds completely to the reflecting area B, which enables the light produced by the backlight source 70 and shining on the reflecting area B to be completely reflected back, thus avoiding a loss of light in the reflecting area B and absorption of light by the polarizer 51, thereby improving the reflection efficiency of light.

Preferably, the reflecting layer 30 is a metal layer. The metal layer is directly coated on the polarizer 51 to improve the utilization rate of the backlight source 70. The metal layer is preferably formed of a material with high reflectivity such as aluminum, silver, etc.

According to embodiment 1 of the present disclosure, thickness of the metal layer can be further designed. Preferably, the reflecting layer is provided with a thickness which increase gradually along a direction from an end thereof close to the transmissive area A to the reflecting area B, which enables the light to be reflected back to the backlight source 70 as much as possible. The light which is reflected back to the backlight source 70 is partly reflected into the transmissive area A by a reflecting plate of the backlight source 70, and the rest of the light is still reflected between the reflecting layer 30 and the backlight source 70.

In addition, the metal layer can be provided with a smooth or rough surface. When the metal layer is provided with a smooth surface, a specular reflection on the smooth surface will occur to the light produced by the backlight source 70, which can strengthen the brightness. When the metal layer is provided with a rough surface, a diffuse reflection on the rough surface will occur to the light produced by the backlight source 70. In the diffuse reflection, the light is reflected to all directions uniformly, thus preventing occurrence of local lightspot.

Figure 2:
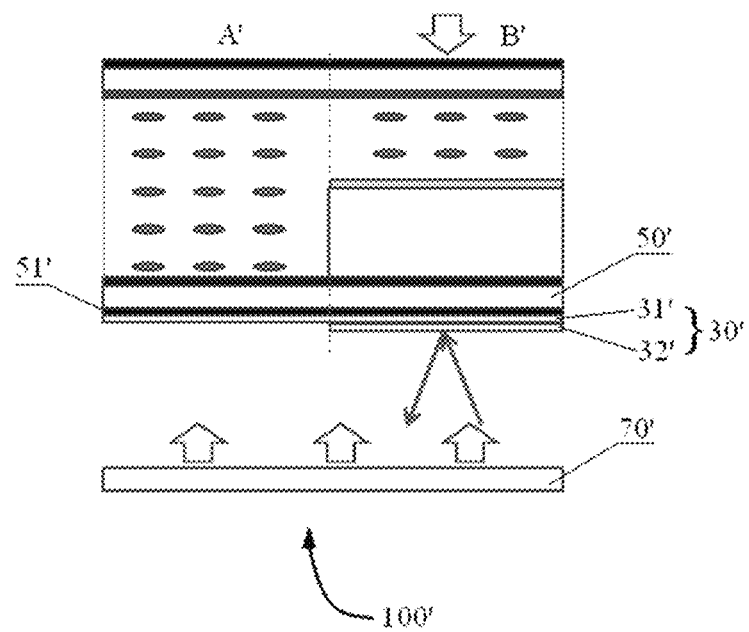
FIG. 2 schematically shows the structure of the transflective liquid crystal display panel according to embodiment 2 of the present disclosure.

According to embodiment 2 of the present disclosure, as shown in FIG. 2, the reflecting layer 30' comprises a transparent film layer 31' arranged on the polarizer 51', and a metal layer 32' coated on the transparent film layer 31'. The arrangement and material of metal layer 32' can be the same as the abovementioned metal layer. The transparent film layer 31' is made of a transparent plastic. The transparent plastic is preferably PET (polyester), PE (polyethylene), PCV (polyvinyl chloride), etc, and further preferably PET (polyester) and PCV (polyvinyl chloride) which are smooth, anti-static, environmentally friendly, and have good weather fastness. In the present disclosure, the metal layer 32' having a high reflectivity is coated on the transparent film layer 31', and then the transparent film layer 31' is stuck on the polarizer 51' at a position corresponding to the reflecting area B', which makes the production process and the assembling of the display panel simpler.

Preferably, the polarizer 51' is completely covered by the transparent film layer 31', and said metal layer is at least partly coated on a region of the transparent film layer 31' corresponding to the reflecting area B'. The complete coverage of the polarizer 51' by the transparent film layer 31' can prevent the light at the border of the transmissive area and the reflecting area from being transmitted or reflected, thus avoiding effects on the contrast ratio and saturation of the liquid crystal display panel 100', and ensuring the image quality thereof.

Further preferably, the transparent film layer 31' can be further provided with a reflecting unit for further improving the reflectivity. The reflecting unit, for example, can be formed by pressing an area of the transparent film layer which corresponds to the reflecting area B'.

A transflective liquid crystal display device according to the present disclosure comprises the above transflective liquid crystal display panel. A transmissive area A and a reflecting area B of the transflective liquid crystal display panel contain a same positive dielectric anisotropy liquid crystal material. The working principle of the transflective liquid crystal display device is the same as that of the existing dual-cell-gap transflective liquid crystal display device, and therefore will not be described herein in detail.

According to the present disclosure, by providing the reflecting layer at the outer surface of the polarizer, the light produced by the backlight source is prevented from being absorbed by the polarizer in the reflecting process, thus avoiding light loss and consequently improving the utilization rate of the backlight source. Besides, the reflecting layer in the present disclosure can be coated or stuck directly on the polarizer, which render the display panel simpler in its structure and consequently greatly reduces the production cost of the display panel.

It should be noted that the above embodiments are described only for better understanding, rather than restricting the present disclosure, and that the language used herein are descriptive and illustrative, rather than prescriptive. Anyone skilled in the art can make amendments to the present disclosure without departing from the spirit and scope of the present disclosure. Although the present disclosure has been described herein with regard to particular implementing forms, materials, and embodiments, it is not limited to the details disclosed herein, but can incorporate the structures, methods and applications equivalent to those claimed by the claims of the present disclosure.

The invention claimed is:

1. A transflective liquid crystal display panel, comprising:
   an array substrate which is provided thereon with a plurality of sub-pixel areas, each of the sub-pixel areas comprising a transmissive area and a reflecting area, and
   a polarizer arranged at an outer surface of the array substrate and having a first surface facing a backlight source,
   wherein an area of the first surface, which corresponds to the reflecting area, is at least partly provided therein with a reflecting layer,
   wherein the reflecting layer has a thickness configured to increase gradually along a direction from an end thereof close to the transmissive area to the reflecting area, and
   wherein the reflecting layer comprises a transparent film layer arranged on the polarizer, and a metal layer coated on the transparent film layer, the transparent film layer arranged between the polarizer and the metal layer.

2. The transflective liquid crystal display panel according to claim 1, wherein the surface of the metal layer is configured to be a smooth or rough surface.

3. The transflective liquid crystal display panel according to claim 1, wherein the polarizer is completely covered by the transparent film layer, and the metal layer is at least partly coated on a region of the transparent film layer corresponding to the reflecting area.

4. The transflective liquid crystal display panel according to claim 1, wherein the transparent film layer is made of a transparent plastic.

5. The transflective liquid crystal display panel according to claim 1, wherein the transmissive area and the reflecting area contain a same positive dielectric anisotropy liquid crystal material.

6. A transflective liquid crystal display device, comprising a transflective liquid crystal display panel which comprises:
   an array substrate which is provided thereon with a plurality of sub-pixel areas, each of the sub-pixel areas comprising a transmissive area and a reflecting area, and
   a polarizer arranged at an outer surface of the array substrate and having a first surface facing a backlight source,
   wherein an area of the first surface, which corresponds to the reflecting area, is at least partly provided therein with a reflecting layer,
   wherein the reflecting layer has a thickness configured to increase gradually along a direction from an end thereof close to the transmissive area to the reflecting area, and
   wherein the reflecting layer comprises a transparent film layer arranged on the polarizer, and a metal layer coated on the transparent film layer, the transparent film layer arranged between the polarizer and the metal layer.

* * * * *